(12) United States Patent
Endo et al.

(10) Patent No.: US 7,201,326 B2
(45) Date of Patent: Apr. 10, 2007

(54) INFORMATION PROCESSING DEVICE

(75) Inventors: Takashi Endo, Musashimurayama (JP); Masahiro Kaminaga, Sakado (JP); Takashi Watanabe, Kokubunji (JP); Kunihiko Nakada, Koganei (JP); Takashi Tsukamoto, Kodaira (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 591 days.

(21) Appl. No.: 10/745,540

(22) Filed: Dec. 29, 2003

(65) Prior Publication Data

US 2004/0136530 A1 Jul. 15, 2004

Related U.S. Application Data

(63) Continuation of application No. 10/217,565, filed on Aug. 14, 2002, now Pat. No. 6,691,921.

(30) Foreign Application Priority Data

Nov. 16, 2001 (JP) .............................. 2001-350936

(51) Int. Cl.
*G06K 19/06* (2006.01)
(52) U.S. Cl. ........................ 235/492; 235/375; 235/380
(58) Field of Classification Search ................ 235/492, 235/380, 382, 375, 383; 713/172, 189, 193; 380/30, 21, 25, 49
See application file for complete search history.

(56) References Cited

U.S. PATENT DOCUMENTS 4,278,837 A * 7/1981 Best ........................... 713/190
4,465,901 A * 8/1984 Best ........................... 713/190
4,630,201 A 12/1986 White
4,764,959 A 8/1988 Watanabe et al.
4,827,113 A 5/1989 Rikuna
4,956,863 A 9/1990 Goss (Continued)

FOREIGN PATENT DOCUMENTS

JP 6-112937 6/1993

(Continued)

OTHER PUBLICATIONS

"Security Methods" The Smart Card Handbook, pp. 262-265.

*Primary Examiner*—Kimberly D. Nguyen
(74) *Attorney, Agent, or Firm*—Reed Smith LLP; Stanley P. Fisher, Esq.; Juan Carlos A. Marquez, Esq.

(57) ABSTRACT

An object of the present invention is to prevent secret information that is being internally processed from being inferred through operational information of a secured device, including the current consumption information. One solution is provided by an information processing device having at least a key generation apparatus that generates key data automatically, an encryption unit that encrypts data with the corresponding key data, a register that stores a plurality of encrypted data items with the corresponding encryption key data items, and an arithmetic unit that performs operations using data expressed with the corresponding encryption key data and new key data as the input, encrypts the operation result with new input key data, and outputs the result, thereby being capable of performing internal processing on an encrypted data expression. Accordingly, only encrypted data is transferred on the internal or external data bus line.

20 Claims, 12 Drawing Sheets

U.S. PATENT DOCUMENTS

| | | | |
|---|---|---|---|
| 5,224,166 A | 6/1993 | Hartman, Jr. | |
| 5,323,323 A | 6/1994 | Gilham | |
| 5,764,772 A | 6/1998 | Kaufman et al. | |
| 5,850,450 A * | 12/1998 | Schweitzer et al. | 380/30 |
| 5,889,622 A | 3/1999 | Wille et al. | |
| 6,182,104 B1 | 1/2001 | Foster et al. | |
| 6,233,339 B1 | 5/2001 | Kawano et al. | |
| 6,363,210 B1 | 3/2002 | Owashi et al. | |
| 6,408,075 B1 | 6/2002 | Ohki et al. | |
| 6,414,558 B1 | 7/2002 | Ryan et al. | |
| 6,419,159 B1 | 7/2002 | Odinak | |
| 6,691,921 B2 * | 2/2004 | Endo et al. | 235/492 |
| 2001/0003540 A1 | 6/2001 | Pomer et al. | |

FOREIGN PATENT DOCUMENTS

| | | |
|---|---|---|
| JP | 7-182304 | 12/1993 |
| JP | 2001-005731 | 6/1999 |
| JP | 2001-92654 | 9/1999 |
| JP | 2001-237825 | 11/2000 |
| WO | WO 99/67766 | 6/1999 |

* cited by examiner

Prior Art  FIG. 1
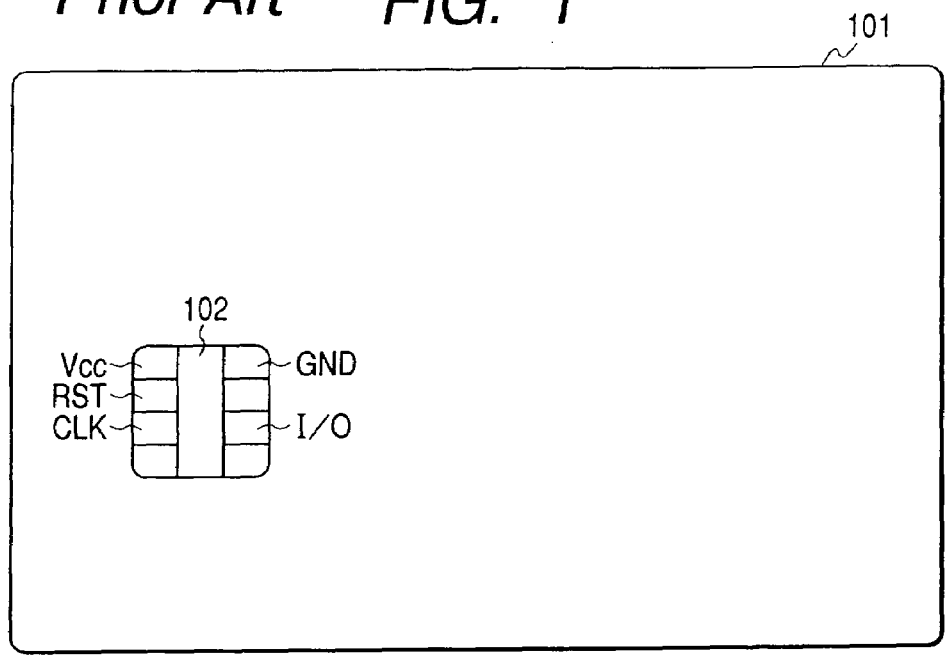
Prior Art  FIG. 2
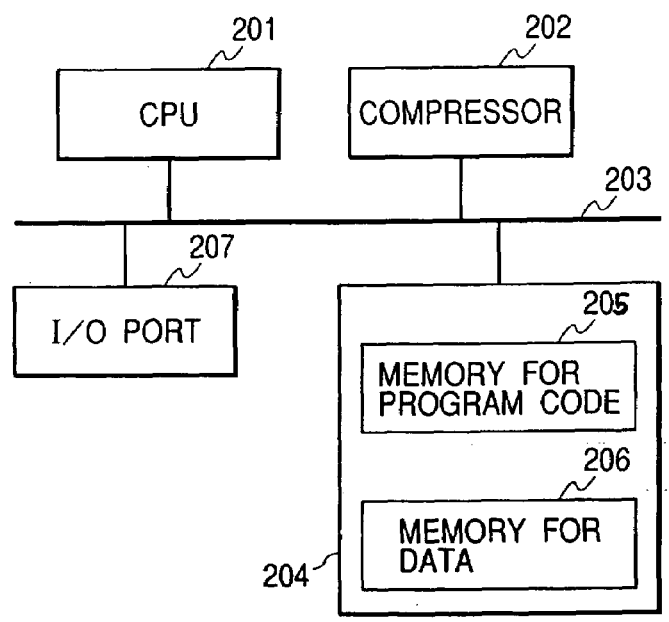

Prior Art FIG. 3
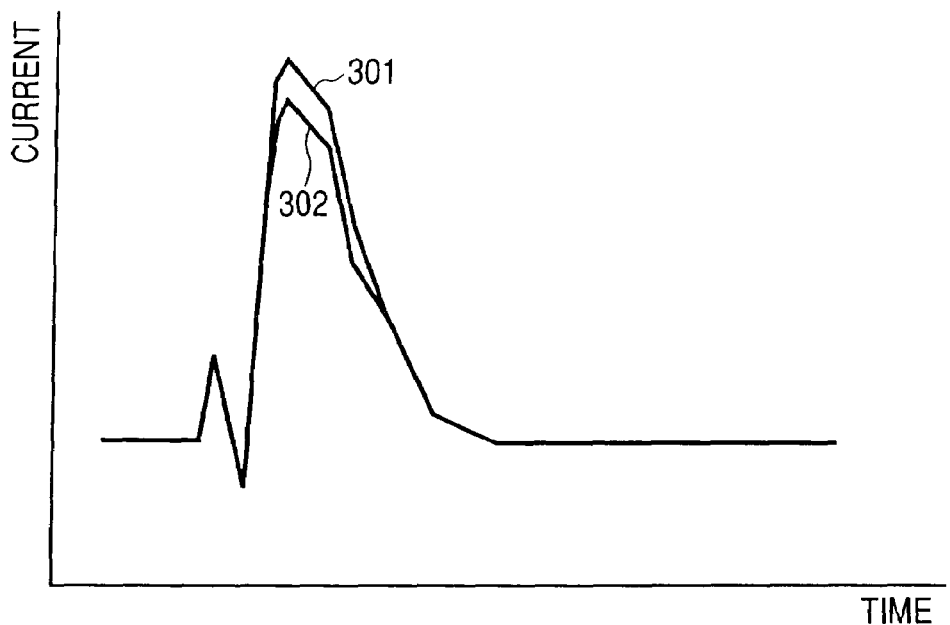
FIG. 4
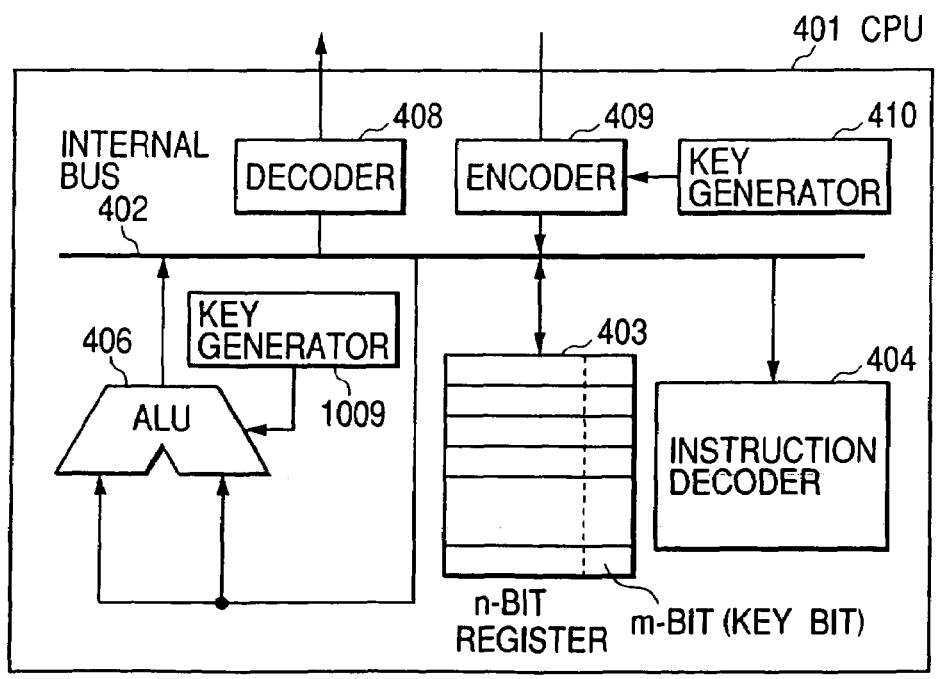

FIG. 6

TRUTH TABLE OF SECURE ADDER

| A | Ak | B | Bk | C | Rk | Cout | R | A | Ak | B | Bk | C | Rk | Cout | R |
|---|----|---|----|---|----|----|---|---|----|---|----|---|----|----|---|
| 0 | 0 | 0 | 0 | 0 | 0 | 0 | 0 | 1 | 0 | 0 | 0 | 0 | 0 | 0 | 1 |
| 0 | 0 | 0 | 0 | 0 | 1 | 1 | 0 | 1 | 0 | 0 | 0 | 0 | 1 | 0 | 1 |
| 0 | 0 | 0 | 0 | 1 | 0 | 0 | 1 | 1 | 0 | 0 | 0 | 1 | 0 | 1 | 0 |
| 0 | 0 | 0 | 0 | 1 | 1 | 1 | 1 | 1 | 0 | 0 | 0 | 1 | 1 | 1 | 0 |
| 0 | 0 | 0 | 1 | 0 | 0 | 0 | 1 | 1 | 0 | 0 | 1 | 0 | 0 | 1 | 0 |
| 0 | 0 | 0 | 1 | 0 | 1 | 0 | 1 | 1 | 0 | 0 | 1 | 0 | 1 | 0 | 0 |
| 0 | 0 | 0 | 1 | 1 | 0 | 1 | 0 | 1 | 0 | 0 | 1 | 1 | 0 | 1 | 1 |
| 0 | 0 | 0 | 1 | 1 | 1 | 1 | 0 | 1 | 0 | 0 | 1 | 1 | 1 | 0 | 1 |
| 0 | 0 | 1 | 0 | 0 | 0 | 0 | 1 | 1 | 0 | 1 | 0 | 0 | 0 | 1 | 0 |
| 0 | 0 | 1 | 0 | 0 | 1 | 0 | 1 | 1 | 0 | 1 | 0 | 0 | 1 | 0 | 0 |
| 0 | 0 | 1 | 0 | 1 | 0 | 1 | 0 | 1 | 0 | 1 | 0 | 1 | 0 | 1 | 1 |
| 0 | 0 | 1 | 0 | 1 | 1 | 1 | 0 | 1 | 0 | 1 | 0 | 1 | 1 | 0 | 1 |
| 0 | 0 | 1 | 1 | 0 | 0 | 0 | 0 | 1 | 0 | 1 | 1 | 0 | 0 | 0 | 1 |
| 0 | 0 | 1 | 1 | 0 | 1 | 1 | 0 | 1 | 0 | 1 | 1 | 0 | 1 | 0 | 1 |
| 0 | 0 | 1 | 1 | 1 | 0 | 0 | 1 | 1 | 0 | 1 | 1 | 1 | 0 | 1 | 0 |
| 0 | 0 | 1 | 1 | 1 | 1 | 1 | 1 | 1 | 0 | 1 | 1 | 1 | 1 | 1 | 0 |
| 0 | 1 | 0 | 0 | 0 | 0 | 0 | 1 | 1 | 1 | 0 | 0 | 0 | 0 | 0 | 0 |
| 0 | 1 | 0 | 0 | 0 | 1 | 0 | 1 | 1 | 1 | 0 | 0 | 0 | 1 | 1 | 0 |
| 0 | 1 | 0 | 0 | 1 | 0 | 1 | 0 | 1 | 1 | 0 | 0 | 1 | 0 | 0 | 1 |
| 0 | 1 | 0 | 0 | 1 | 1 | 1 | 0 | 1 | 1 | 0 | 0 | 1 | 1 | 1 | 1 |
| 0 | 1 | 0 | 1 | 0 | 0 | 1 | 0 | 1 | 1 | 0 | 1 | 0 | 0 | 0 | 1 |
| 0 | 1 | 0 | 1 | 0 | 1 | 0 | 0 | 1 | 1 | 0 | 1 | 0 | 1 | 0 | 1 |
| 0 | 1 | 0 | 1 | 1 | 0 | 1 | 1 | 1 | 1 | 0 | 1 | 1 | 0 | 1 | 0 |
| 0 | 1 | 0 | 1 | 1 | 1 | 0 | 1 | 1 | 1 | 0 | 1 | 1 | 1 | 1 | 0 |
| 0 | 1 | 1 | 0 | 0 | 0 | 1 | 0 | 1 | 1 | 1 | 0 | 0 | 0 | 0 | 1 |
| 0 | 1 | 1 | 0 | 0 | 1 | 0 | 0 | 1 | 1 | 1 | 0 | 0 | 1 | 0 | 1 |
| 0 | 1 | 1 | 0 | 1 | 0 | 1 | 1 | 1 | 1 | 1 | 0 | 1 | 0 | 1 | 0 |
| 0 | 1 | 1 | 0 | 1 | 1 | 0 | 1 | 1 | 1 | 1 | 0 | 1 | 1 | 1 | 0 |
| 0 | 1 | 1 | 1 | 0 | 0 | 0 | 1 | 1 | 1 | 1 | 1 | 0 | 0 | 0 | 0 |
| 0 | 1 | 1 | 1 | 0 | 1 | 0 | 1 | 1 | 1 | 1 | 1 | 0 | 1 | 1 | 0 |
| 0 | 1 | 1 | 1 | 1 | 0 | 1 | 0 | 1 | 1 | 1 | 1 | 1 | 0 | 0 | 1 |
| 0 | 1 | 1 | 1 | 1 | 1 | 1 | 0 | 1 | 1 | 1 | 1 | 1 | 1 | 1 | 1 |

FIG. 7

TRUTH TABLE OF SECURE ADDER

| A | Ak | B | Bk | C | Rk | Cout | R |
|---|----|---|----|---|----|------|---|
| 0 | 0 | 0 | 0 | 0 | 0 | 1 | 1 |
| 0 | 0 | 0 | 0 | 0 | 1 | 0 | 1 |
| 0 | 0 | 0 | 0 | 1 | 0 | 1 | 0 |
| 0 | 0 | 0 | 0 | 1 | 1 | 0 | 0 |
| 0 | 0 | 0 | 1 | 0 | 0 | 0 | 0 |
| 0 | 0 | 0 | 1 | 0 | 1 | 0 | 0 |
| 0 | 0 | 0 | 1 | 1 | 0 | 1 | 1 |
| 0 | 0 | 0 | 1 | 1 | 1 | 1 | 1 |
| 0 | 0 | 1 | 0 | 0 | 0 | 0 | 0 |
| 0 | 0 | 1 | 0 | 0 | 1 | 0 | 0 |
| 0 | 0 | 1 | 0 | 1 | 0 | 1 | 1 |
| 0 | 0 | 1 | 0 | 1 | 1 | 1 | 1 |
| 0 | 0 | 1 | 1 | 0 | 0 | 1 | 1 |
| 0 | 0 | 1 | 1 | 0 | 1 | 0 | 1 |
| 0 | 0 | 1 | 1 | 1 | 0 | 1 | 0 |
| 0 | 0 | 1 | 1 | 1 | 1 | 0 | 0 |
| 0 | 1 | 0 | 0 | 0 | 0 | 0 | 0 |
| 0 | 1 | 0 | 0 | 0 | 1 | 0 | 0 |
| 0 | 1 | 0 | 0 | 1 | 0 | 1 | 1 |
| 0 | 1 | 0 | 0 | 1 | 1 | 1 | 1 |
| 0 | 1 | 0 | 1 | 0 | 0 | 0 | 1 |
| 0 | 1 | 0 | 1 | 0 | 1 | 1 | 1 |
| 0 | 1 | 0 | 1 | 1 | 0 | 0 | 0 |
| 0 | 1 | 0 | 1 | 1 | 1 | 1 | 0 |
| 0 | 1 | 1 | 0 | 0 | 0 | 0 | 1 |
| 0 | 1 | 1 | 0 | 0 | 1 | 1 | 1 |
| 0 | 1 | 1 | 0 | 1 | 0 | 0 | 0 |
| 0 | 1 | 1 | 0 | 1 | 1 | 1 | 0 |
| 0 | 1 | 1 | 1 | 0 | 0 | 0 | 0 |
| 0 | 1 | 1 | 1 | 0 | 1 | 0 | 0 |
| 0 | 1 | 1 | 1 | 1 | 0 | 1 | 1 |
| 0 | 1 | 1 | 1 | 1 | 1 | 1 | 1 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | 1 | 1 |
| 1 | 0 | 0 | 0 | 1 | 1 | 1 | 1 |
| 1 | 0 | 0 | 1 | 0 | 0 | 0 | 1 |
| 1 | 0 | 0 | 1 | 0 | 1 | 1 | 1 |
| 1 | 0 | 0 | 1 | 1 | 0 | 0 | 0 |
| 1 | 0 | 0 | 1 | 1 | 1 | 1 | 0 |
| 1 | 0 | 1 | 0 | 0 | 0 | 0 | 1 |
| 1 | 0 | 1 | 0 | 0 | 1 | 1 | 1 |
| 1 | 0 | 1 | 0 | 1 | 0 | 0 | 0 |
| 1 | 0 | 1 | 0 | 1 | 1 | 1 | 0 |
| 1 | 0 | 1 | 1 | 0 | 0 | 0 | 0 |
| 1 | 0 | 1 | 1 | 0 | 1 | 0 | 0 |
| 1 | 0 | 1 | 1 | 1 | 0 | 1 | 1 |
| 1 | 0 | 1 | 1 | 1 | 1 | 1 | 1 |
| 1 | 1 | 0 | 0 | 0 | 0 | 1 | 1 |
| 1 | 1 | 0 | 0 | 0 | 1 | 0 | 1 |
| 1 | 1 | 0 | 0 | 1 | 0 | 1 | 0 |
| 1 | 1 | 0 | 0 | 1 | 1 | 0 | 0 |
| 1 | 1 | 0 | 1 | 0 | 0 | 0 | 0 |
| 1 | 1 | 0 | 1 | 0 | 1 | 0 | 0 |
| 1 | 1 | 0 | 1 | 1 | 0 | 1 | 1 |
| 1 | 1 | 0 | 1 | 1 | 1 | 1 | 1 |
| 1 | 1 | 1 | 0 | 0 | 0 | 0 | 0 |
| 1 | 1 | 1 | 0 | 0 | 1 | 0 | 0 |
| 1 | 1 | 1 | 0 | 1 | 0 | 1 | 1 |
| 1 | 1 | 1 | 0 | 1 | 1 | 1 | 1 |
| 1 | 1 | 1 | 1 | 0 | 0 | 1 | 1 |
| 1 | 1 | 1 | 1 | 0 | 1 | 0 | 1 |
| 1 | 1 | 1 | 1 | 1 | 0 | 1 | 0 |
| 1 | 1 | 1 | 1 | 1 | 1 | 0 | 0 |

FIG. 17

LOWER 4 BIT

| HIGHER 4 BIT | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | NOP | | STC | LDC | ORC | XORC | ANDC | LDC | ADD | | | | MOV | | ADDX | |
| 0001 | | | | | OR | XOR | AND | | SUB | | | | CMP | | SUBX | |
| 0010 | MOV.B |||||||||||||||
| 0011 | MOV.B |||||||||||||||
| 0100 | BRA | BRN | BHI | BLS | BCC | BCS | BNE | BEQ | BVC | BVS | BPL | BMI | BGE | BLT | BGT | BLE |
| 0101 | MULXU | DIVXU | MULXU | DIVXU | RTS | BSR | RTE | TRAPA | | | JMP | | BSR | | JSR | |
| 0110 | BSET | BNOT | BCLR | BTST | OR | XOR | AND | BST | MOV ||||||||
| 0111 | BSET | BNOT | BCLR | BTST | BOR | BXOR | BAND | BLD | MOV | | EEPMOV | | | | | |
| 1000 | AND |||||||||||||||
| 1001 | ADDX |||||||||||||||
| 1010 | CMP |||||||||||||||
| 1011 | SUBX |||||||||||||||
| 1100 | OR |||||||||||||||
| 1101 | XOR |||||||||||||||
| 1110 | AND |||||||||||||||
| 1111 | MOV |||||||||||||||

FIG. 18

LOWER 4 BIT

HIGHER 4 BIT

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 00000 | BSR | RTS | TRAPA | RTE | DIVXU | MULXU | DIVXU | MULXU | JSR | BSR | JSR | | JMP | | JMP | JMP |
| 00001 | BCS | BCC | BEQ | BNE | BRN | BRA | BLS | BHI | BLT | BGE | BLE | BGT | BVS | BVC | BMI | BPL |
| 00010 | BXOR | BOR | BLD | BAND | BNOT | BSET | BTST | BCLR | | | | | | | MOV | EEPMOV |
| 00011 | XOR | OR | BST | AND | | | | | MOV | | | | | | | |
| 00100 | XOR | OR | | AND | | | | | CMP | | SUBX | SUB | | | | |
| 00101 | XORC | ORC | LDC | ANDC | | NOP | LDC | STC | MOV | | ADDX | ADD | | | | |
| 00110 | MOV.B | | | | | | | | | | | | | | | |
| 00111 | MOV.B | | | | | | | | | | | | | | | |
| 01000 | XOR | | | | | | | | | | | | | | | |
| 01001 | OR | | | | | | | | | | | | | | | |
| 01010 | AND | | | | | | | | | | | | | | | |
| 01011 | MOV | | | | | | | | | | | | | | | |
| 01100 | ADDX | | | | | | | | | | | | | | | |
| 01101 | AND | | | | | | | | | | | | | | | |
| 01110 | SUBX | | | | | | | | | | | | | | | |
| 01111 | CMP | | | | | | | | | | | | | | | |
| 10000 | CMP | | | | | | | | | | | | | | | |
| 10001 | SUBX | | | | | | | | | | | | | | | |
| 10010 | AND | | | | | | | | | | | | | | | |
| 10011 | ADDX | | | | | | | | | | | | | | | |
| 10100 | AND | | | | | | | | | | | | | | | |
| 10101 | MOV | | | | | | | | | | | | | | | |
| 10110 | OR | | | | | | | | | | | | | | | |
| 10111 | XOR | | | | | | | | | | | | | | | |
| 11000 | MOV.B | | | | | | | | | | | | | | | |
| 11001 | MOV.B | | | | | | | | | | | | | | | |
| 11010 | | | ADD | ADDX | | MOV | | | STC | LDC | NOP | | ANDC | LDC | ORC | XORC |
| 11011 | | | SUB | SUBX | | CMP | | | | | | | AND | | OR | XOR |
| 11100 | MOV | | | | | | | | BCLR | BTST | BSET | BNOT | AND | BST | OR | XOR |
| 11101 | | EEPMOV | MOV | | | | | | BCLR | BTST | BSET | BNOT | BAND | BLD | BOR | BXOR |
| 11110 | BPL | BMI | BVC | BVS | BGT | BLE | BGE | BLT | BHI | BLS | BRA | BRN | BNE | BEQ | BCC | BCS |
| 11111 | JMP | JMP | | JMP | | JSR | BSR | JSR | MULXU | DIVXU | MULXU | DIVXU | RTE | TRAPA | RTS | BSR |

INFORMATION PROCESSING DEVICE

This application is a Continuation application of nonprovisional U.S. application Ser. No. 10/217,565 filed on Aug. 14, 2002 now U.S. Pat. No. 6,691,921. Priority is claimed based upon U.S. application Ser. No. 10/217,565 filed on Aug. 14, 2002 which claims the priority date of Japanese application 2001-350936 filed on Nov. 16, 2001.

BACKGROUND OF THE INVENTION

1. Field of the Invention

The present invention relates to an information processing device, and more particularly to a tamper proof device such as an integrated circuit card (IC card) having a high degree of security.

2. Description of the Related Art

The IC cards are intended for holding information that must not be tampered by encrypting data with secret encryption keys and decrypting the encrypted text. An IC card has no internal power source and becomes operable only when inserted into a card reader/writer by which it is powered. When it becomes operable, the IC card receives commands from the card reader/writer and transfers data as commanded. The general descriptions of IC cards can be found in books such as IC Card, Junichi Mizusawa, The Institute of Electronics, Information and Communication Engineers, published by Ohm.

As shown in FIG. 1, an IC card 101 includes an IC card chip 102. An IC card generally has a set of contacts, through which power is supplied and data communication is performed.

The structure of an IC card chip is basically the same as that of a microprocessor. As shown in FIG. 2, the IC card chip is organized into a central processing unit (CPU) 201, a memory unit 204, an I/O port 207, and a coprocessor 202. The central processing unit (CPU) 201 performs logic and arithmetic operations, and the memory unit 204 stores programs and data. The I/O port 207 communicates with external card reader/writers. The coprocessor 202 is specifically used for performing modulo arithmetic, such as operations required in the RSA public key cipher. There are also many IC card processors without coprocessors. A data bus 203 provides links among these components.

The memory unit includes a read-only memory (ROM), a random access memory (RAM), and an electrically erasable programmable read-only memory (EEPROM). ROM is not modifiable, and mainly stores program code. RAM is rewritable, but its contents are lost when power is off. RAM therefore cannot be used to retain data after the IC card is withdrawn from the reader/writer such that its power supply is stopped. EEPROM is rewritable, and it retains its contents even without power. EEPROM is used to store data that must sometimes be rewritten and must be retained even when the IC card is removed from the reader/writer. EEPROM is used, for example, in a prepaid card that retains data indicating the amount of use, which has to be rewritten at every use and must be retained after the card is withdrawn from the card reader/writer.

IC cards store programs and data inside an enclosed IC card chip so as to store important information and perform cryptographic processing. The degree of difficulty in deciphering cryptographic processing in IC cards has been considered to be similar to the difficulty of deciphering cryptographic algorithms. It is suggested, however, that there is a risk that information being cryptographically processed in IC cards and the cryptographic keys used for such processing may be inferred through observation and analysis of current consumption during the cryptographic processing, which is easier than deciphering cryptographic algorithms. The current consumption can be observed by measuring current that is supplied from the card reader/writer. Such risks are described in '8.5.1.1 Passive protective mechanisms' p. 263 of *Smart Card Handbook* written by W. Rankl & W. Effing, John Wiley & sons Co.

The CMOS circuits in an IC card chip consume current when their output changes from '1' to '0', and vice versa. The data bus 203 has a particularly large electrical capacitance such that it draws a large current when the value placed on it changes from '1' to '0', or vice versa. This suggests the possibility that observation of the current consumption can reveal the operations inside the IC card chip.

FIG. 3 is a graph showing current consumption waveforms over one processing cycle in an IC card chip. The waveforms vary as indicated with lines 301 and 302 depending on the data being processed. The variations are caused by differences in data carried on the data bus 203 and data being processed in the CPU 201.

Therefore, it is possible to infer which component is operating or what kind of data is being processing from the current consumption.

As countermeasures against such risks, the prior art provides two general methods: one method keeps the values of current consumption constant; the other method changes the current consumption while performing the same processing. An example of the former method provides a positive data bus, a negative data bus and a plurality of arithmetic units, which perform dummy and real operations concurrently to keep the current consumption constant regardless of the input data and operational results (PCT WO 99/67766). This method, however, raises problems of increased hardware scale, such as a doubling of the bus width and a quadrupling of the number of arithmetic units. As an example of the latter method, a method for encrypting data transferred on the bus or stored in memory has been suggested (JP-A-5731/2001). This method imposes a programming restriction, however, because the difference in life time of a plurality of data sharing the same key information places a limitation on the timing of updating of the encryption key.

SUMMARY OF THE INVENTION

An object of the present invention is to reduce the correlation between data being processed and current consumption in an IC card microprocessor chip without adding substantial hardware scale or programming restrictions.

According to one aspect of the invention, the information processing device includes a memory unit; an arithmetic unit; first encryption means for encrypting data written into/read from the memory unit or data input into/output from the arithmetic unit with a first cryptographic algorithm into first data including first key data and first encrypted data; and transfer means for transferring the first data into/from the memory unit or the arithmetic unit such that only encrypted data is transferred thereby.

According to another aspect of the invention, the information processing device includes an arithmetic unit; first encryption means for encrypting data to be input into the arithmetic unit into first data including first key data and first encrypted data; at least one decoder for decrypting the first data; at least one encoder for encrypting output of the arithmetic unit into second data including second key data and second encrypted data; transfer means for transferring data into/from the arithmetic unit such that only encrypted data is transferred thereby. The decoder and the encoder are disposed close to the arithmetic unit so as to reduce current consumption therebetween.

According to a third aspect of the invention, the information processing device includes a memory unit; an arithmetic unit; first encryption means for encrypting data written into/read from the memory unit or data input into/output from the arithmetic unit with a first cryptographic algorithm into first data including first key data and first encrypted data; and second encryption means for encrypting the first data with a second cryptographic algorithm into second data including second key data and second encrypted data to be stored in at least one of ROM/EEPROM and RAM of the memory unit.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 1 shows a semiconductor integrated circuit device in an IC card;

FIG. 2 shows the basic structure of a microprocessor;

FIG. 3 is a drawing showing current consumption waveforms in one processing cycle in an ordinary IC card chip;

FIG. 4 is a block diagram showing an embodiment of the present invention;

FIG. 6 is a truth table of an embodiment of an encryption full adder according to the present invention;

FIG. 7 is a truth table of another embodiment of an encryption full adder according to the present invention;

FIG. 17 is an example of a correspondence table between instruction codes and instructions; and FIG. 18 is another example of the correspondence table between instruction codes and instructions of the present invention.

DESCRIPTION OF THE PREFERRED EMBODIMENTS

Figure 5:
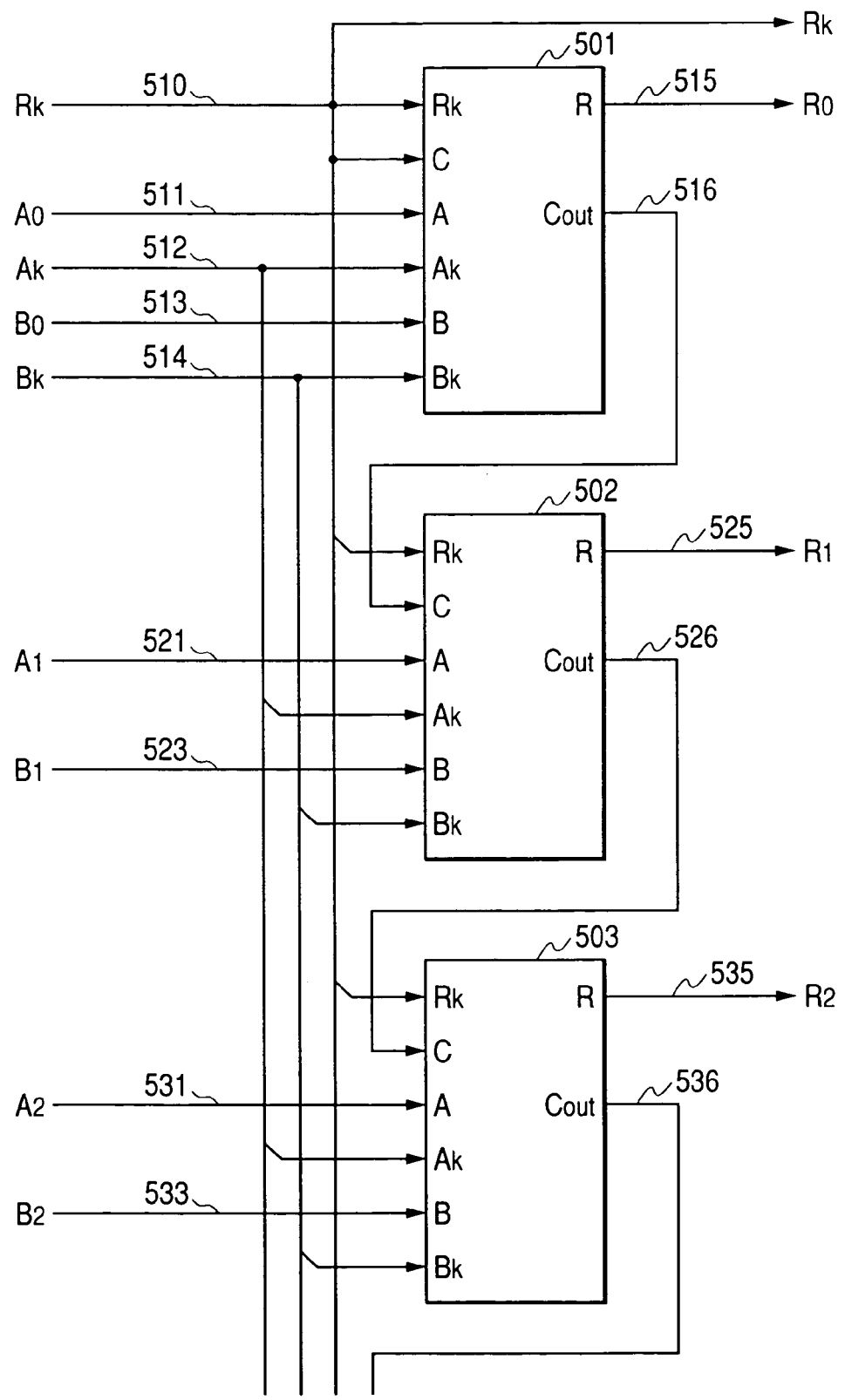
FIG. 5 shows an embodiment of an adder according to the present invention.

There are two methods of reducing the correlation between the data being processed and the current consumption: (1) changing the current consumption in an unpredictable way even if the value of data being processed is the same, and (2) keeping the current consumption constant even if the value of the data to be processed varies.

The present invention reduces the correlation between current consumption and data by the first method (1). Basically, this method makes the correlation between the true value of the data and its electrical expression unpredictable by encrypting the data and changing the encryption key at short time intervals. In this case, if the encryption key is shared among a plurality of data items, changing the encryption key entails the necessity of rewriting all of the data items sharing it. Therefore, the amount of data that shares an encryption key should be minimized, and more preferably should be the same as the size of the access unit. For example, keys may be provided per byte. The number of bits of a key may be 1 bit at the minimum. A 1-bit key can also be considered to be a selection bit for selecting two types of keys. A simple exemplary method is to invert the data when the key bit is a '1', and not to invert the data when the key bit is a '0'. The cryptography used in this method can be considered to be a kind of Vernam cipher, equivalent to the use of 255 as a key for a key bit of '1', and the use of 0 as a key for a key bit of '0'. The Vernum cipher performs encryption by an exclusive-or (xor) operation using a secret key K, and performs decryption by xoring the encrypted data again with the secret key K that was used for encryption.

$$\text{Encrypted data} = (\text{key bit} \times 255) \text{ xor plaintext data} \quad \text{(Eq. 1)}$$

Suppose the decimal number 63 is to be encrypted and the key bit is '1'. The encryption equation can be expressed in binary notation as follows.

$$(1 \times 11111111(b)) \text{ xor } 00111111(b) = 11000000(b) \quad \text{(Eq. 2)}$$

If the key bit is added as the most significant bit, then 63 is encrypted to 448 as follows.

$$\text{Encrypted data} = 111000000(b) = 448 \quad \text{(Eq. 3)}$$

The encrypted data can then be decrypted by taking the most significant bit as the key bit and the lower 8 bits as the encrypted data as follows.

$$\text{Plaintext data} = (\text{key bit} \times 255) \text{ xor encrypted data} \quad \text{(Eq. 4)}$$

This can be expressed in binary notation as follows.

$$(1 \times 11111111(b)) \text{ xor } 11000000(b) = 00111111(b) = 63 \quad \text{(Eq. 5)}$$

Other key values can be selected by the bits in (Eq. 1) and (Eq. 4). In this case, the two key data items selected by the one key bit should become all '1's when xored. This is because two key data items having bits of the same value constantly produce the same encrypted value of the bit to be processed. The values 0 and 255 satisfy this condition. Therefore, if the data to be processed is 8-bit data, the value of the encryption key is K, and the key bit is 1 bit, the encryption and decryption equations are the following.

$$\text{encrypted data} = (\text{not } (\text{key bit} \times 255) \text{ xor key value}) \text{ xor plaintext data} \quad \text{(Eq. 6)}$$

and $$\text{plaintext data} = (\text{not } (\text{key bit} \times 255) \text{ xor key value}) \text{ xor encrypted data} \quad \text{(Eq. 7)}$$

The key bit may be stored by adding it at the highest or any other bit position. Suppose the key value is 170 (=10101010 (b)) and the plaintext data value is 123. If the key bit is '1', then $$\begin{aligned}(\text{not}\,(1\times 255)\;xor\;170)\;xor\;123 &= (\text{not}\,(1\times 11111111(b)))\;xor \\ &\quad 10101010(b))\;xor\,1111011(b) \\ &= (\text{not}\,(11111111(b)))\;xor \\ &\quad 10101010(b))\;xor\;1111011(b) \\ &= 10101010(b)\;xor\;111011(b) \\ &= 11010001(b) \\ &= 209\end{aligned}$$ (Eq. 8)

If the key bit is added to the highest position, then the encrypted value becomes 209+256=465. Similarly, if the key bit is '0', then $$\begin{aligned}(\text{not}\,(0\times 256)\;xor\;170)\,xor\,123 &= (\text{not}\,(0\times 11111111(b)))\;xor \\ &\quad 10101010(b)\;xor\;1111011(b) \\ &= (\text{not}\,(0)\;xor\;10101010(b))\,xor \\ &\quad 1111011(b) \\ &= 01010101(b)\;xor\;1111011(b) \\ &= 00101110(b) \\ &= 46\end{aligned}$$ (Eq. 9)

The value of the key bit is '0', so the value obtained by adding the key bit is also 46. The applicable register is able to store encrypted data with the encryption bit. The encrypted data is stored as is and is decrypted only when the true value is necessary, such as at the time of arithmetic operations.

Next, in decryption, since 465 includes the key bit of '1' and the encrypted data value of 209, $$\begin{aligned}(\text{not}\,(1\times 255)\;xor\;170)\;xor\;209 &= 170\;xor\;209 \\ &= 123\end{aligned}$$ (Eq. 10)

Similarly, since 46 includes the key bit of '0' and the encrypted data value of 46, $$(\text{not}\,(0\times 255)\;\times or\;170)\times or\;46 = 85\times or\;46 = 123$$ (Eq. 11)

The correct value is obtained by decryption in both cases.

Figure 11:
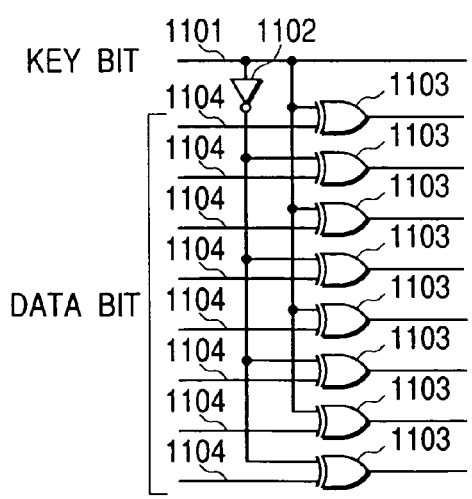
FIG. 11 shows an embodiment of an encryption unit and a decryption unit used in the present invention.

FIG. 11 shows an exemplary logic circuit implementing the above process (Eq. 6 and Eq. 7).

Figure 12:
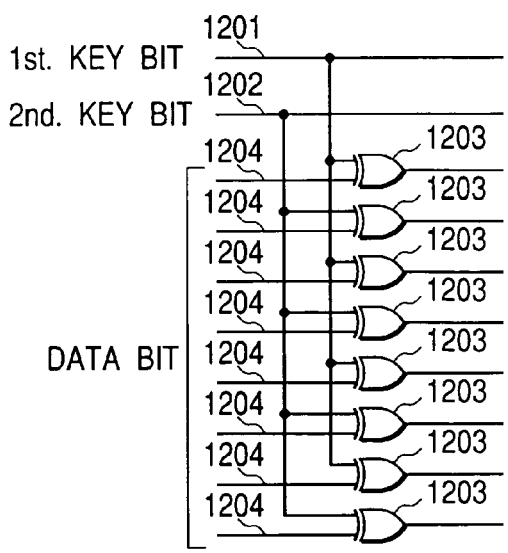
FIG. 12 shows an embodiment of an encryption unit and a decryption unit used in the present invention.

If there is only one key bit, current consumption differs depending on whether the value of the key bit is '1' or '0'. In a bus of the pre-charged type, the voltage of which is first raised, then decreased according to the value of the bit, current consumption varies depending on the value of the key bit and on whether discharging is performed after charging. Therefore, it is preferable to use a plurality of bits to express the key bit, to prevent variations in current consumption depending on the key bit value. It is assumed that two bits are used to express the key bit. If two bits (key bit 1 and key bit 2) are used to express key bits '0' and '1', the '1' state of the key bit is expressed by (key bit 1=1, key bit 2=0), and the '0' state of the key bit is expressed by (key bit 1=0, key bit 2=1). FIG. 12 shows an embodiment of the encoder/decoder circuit in which one key bit is expressed by a pair of signal-flow paths.

An information processing device according to the present invention provides encryption and decryption units at positions such that a link to conventional memory units and buses is possible. More specifically, the information processing device disposes the decryption unit at the point from which data is output to the outside, and the decryption unit decrypts the data and then outputs the decrypted data to a conventional bus or memory unit. The encryption unit is disposed at the point from which data is input from the outside, and the encryption unit encrypts data from a conventional bus or memory unit and then passes the encrypted data into the information processing device.

There are two methods of performing arithmetic operations on encrypted data. One is to place a decryption unit at the input interface of the arithmetic unit and an encryption unit at the output interface from which operational results are obtained. The other is to construct an arithmetic circuit capable of operation on the encrypted data as is. A method of implementing an encrypted full adder that receives encrypted data as input and outputs encrypted arithmetic results is described by taking a 1-bit full adder as an example.

First, with an ordinary full adder that is not encrypted, suppose the two inputs are A' and B', the carry bit from the lower-order position is C'in, the carry bit to the higher-order position is C'out, and the addition result is R'. The relationships of A', B', C'in, C'out, and R' can be expressed as follows.

R'=A' xor B' xor C'in          (Eq. 12)

C'out=A' and B' or (A' xor B') and C'in          (Eq. 13)

Next, an encrypted full adder is assumed. It is assumed that the first encrypted input data is A, the key bit of the first input data is Ak, the second encrypted input data is B, the key bit of the second input data is Bk, the carry bit produced to the higher-order position is Cout, the carry bit from the lower-order position is Cin, the addition result is R, and the encryption bit carrying Cout, Cin, and R is Rk.

In this case, in an encrypted full adder that inverts bits when the encryption bit is '1', the relationship between A', B', C'in, C'out, and R' of the input and output of the unencrypted full adder, and A, k, B, Bk, Cin, Cout, R, and Rk of the input and output of the encrypted full adder can be expressed as follows.

A'=A xor Ak

B'=B xor Bk

C'in=Cin xor Rk

C'out=Cout xor Rk

R'=R xor Rk          (Eq. 14)

Substituting (Eq. 14) with equations (Eq. 12, Eq. 13) yields the logic expressions of the encrypted full adder as the following.

$$R = (A \text{ xor } Ak \text{ xor } B \text{ xor } Bk \text{ xor } Cin \text{ xor } Rk) \text{ xor }$$
$$Rk = A \text{ xor } B \text{ xor } Cin \text{ xor } Ak \text{ xor } Bk \quad \text{(Eq. 15)}$$

$$Cout = ((A \text{ xor } Ak) \text{ and } (B \text{ xor } Bk) \text{ or } ((A \text{ xor } Ak)$$
$$\text{xor } (B \text{ xor } Bk)) \text{ and } (Cin \text{ xor } Rk) \text{ xor } Rk = ((A$$
$$\text{xor } Ak) \text{ and } (B \text{ xor } Bk) \text{ or } (A \text{ xor } B \text{ xor } Ak \text{ xor }$$
$$Bk)) \text{ and } (Cin \text{ xor } Rk)) \text{ xor } Rk \quad \text{(Eq. 16)}$$

Using De Morgan's theorem, $$X \text{ or } Y = \text{not } ((\text{not } X) \text{ and } (\text{not } Y)) \quad \text{(Eq. 17)}$$

(Eq. 16) may be written as the following.

$$Cout = (((A \text{ xor } Ak) \text{ nand } (B \text{ xor } Bk)) \text{ nand } ((A \text{ xor } B$$
$$\text{xor } Ak \text{ xor } Bk) \text{ nand } (Cin \text{ xor } Rk))) \text{ xor } Rk \quad \text{(Eq. 18)}$$

Figure 8:
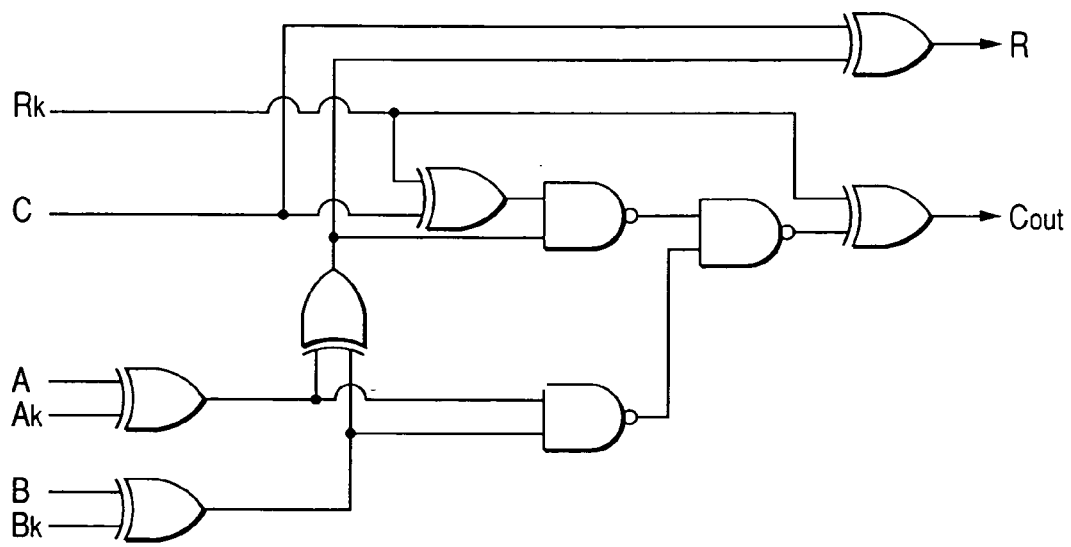
FIG. 8 shows an embodiment of a logic circuit synthesized from the truth table shown in FIG. 6.

Equations (Eq. 15) and (Eq. 18) can be expressed in the logic circuit shown in FIG. 8.

Next, it is assumed that an encrypted full adder that reverses bits when the encryption bit is '0'. The bits Cin and Cout are assumed to be inverted when the encryption bit is '1'. Then the relationships between A', B', C'in, C'out, and R' and A, Ak, B, Bk, Cin, Cout, R, and Rk can be expressed by equation (Eq. 19).

$$A' = A \text{ xor not } Ak$$

$$B' = B \text{ xor not } Bk$$

$$C'in = Cin \text{ xor } Rk$$

$$C'out = Cout \text{ xor } Rk$$

$$R' = R \text{ xor not } Rk \quad \text{(Eq. 19)}$$

By substituting (Eq. 19) with equations (Eq. 12) and (Eq. 13) and applying De Morgan's theorem, the logic expression of the encrypted full adder that inverts bits when the encryption bit is '0' can be determined in the following way.

$$R = (A \text{ xor } (\text{not } Ak) \text{ xor } B \text{ xor } (\text{not } Bk) \text{ xor } Cin \text{ xor }$$
$$Rk) \text{ xor } (\text{not } Rk) = \text{not } (A \text{ xor } B \text{ xor } Cin \text{ xor } Ak$$
$$\text{xor } Bk) \quad \text{(Eq. 20)}$$

$$Cout = (((A \text{ xor not } Ak) \text{ nand } (B \text{ xor not } Bk)) \text{ nand }$$
$$((A \text{ xor } B \text{ xor not } Ak \text{ xor not } Bk) \text{ nand } (Cin$$
$$\text{xor } Rk))) \text{ xor } Rk = (((A \text{ xor } Ak) \text{ or } (B \text{ xor } Bk))$$
$$\text{nand } ((A \text{ xor } B \text{ xor } Ak \text{ xor } Bk) \text{ nand } (Cin \text{ xor }$$
$$Rk))) \text{ xor } Rk \quad \text{(Eq. 21)}$$

Figure 9:
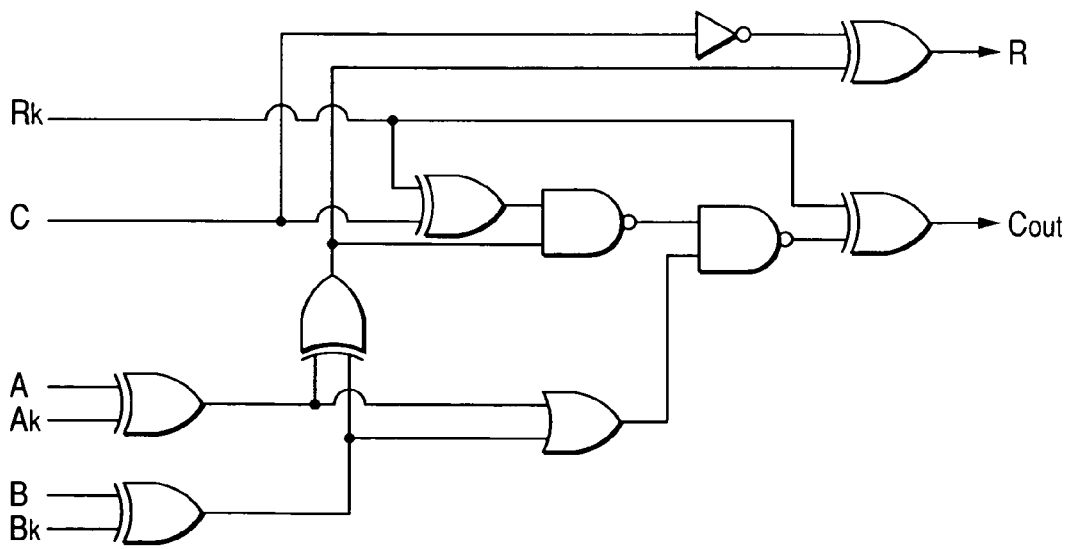
FIG. 9 shows an embodiment of a logic circuit synthesized from the truth table shown in FIG. 7.

FIG. 9 shows a logic circuit implementing these equations (Eq. 20 and Eq. 21). An array of the 1-bit full adders shown in FIGS. 8 and 9 can implement an adder for a plurality of bits.

For example, an encrypted full adder for performing encryption with 0x55 when the encryption bit is '0' and encryption with 0xAA when the encryption bit is '1' can be implemented by an array of eight encrypted full adders expressed alternately by the logic circuit in FIG. 9 and the logic circuit in FIG. 8, with the logic circuit in FIG. 9 is in the lowest-order position.

There are two ways to implement an instruction decoder that interprets and executes encrypted data: one is to connect a decryption unit at the point at which instructions from the instruction decoder are received into the information processing device; the other is to provide a decoder with a many-to-one correspondence between instruction codes and instructions such that the encrypted data can be directly interpreted and executed. Encrypting instruction codes yields a number of encrypted values equal to the number of different encrypted bit values. All of the values obtained through encryption are made to correspond to the instruction that corresponds to the original instruction code. A correspondence between all the instruction codes and instructions is established in this way, and a table showing the many-to-one correspondence between the encrypted instruction codes and instructions is generated. Constructing a decoder according to the table makes it possible to implement a decoder that can interpret encrypted instruction codes without decrypting them.

FIG. 4 is a block diagram showing the basic structure of an information processing device for presenting a brief description of a first embodiment of the present invention. FIG. 4 shows only the main components of the parts associated with the present invention in the information processing device. Some conventional structures may suffice for the other parts of the information processing device. The CPU 401 comprises a key generator 1009 that generates keys used for encryption of operation results, an arithmetic unit 406 that receives encrypted values as inputs and outputs the results in encrypted form, an encoder 409 that encrypts data received from an internal bus 402, a register 403, an instruction decoder 404, and external ports, a key generator 410 that generates keys for encryption in the encoder 409, and a decoder 408 that decrypts data when the data is output to the external ports and elsewhere. The CPU 401 has the structure shown in the drawing. The instruction decoder 404 uses both encrypted data and key bits sent from the internal bus 402 to determine the instruction to be executed. This type of instruction decoder can be implemented easily, for example, by configuring a decoder circuit under the assumption that (n+m) bit data obtained by combining n data bits and m key bits is used as an instruction code. In the present embodiment, n=8 bits and m=1 bit. First, there is a processor for which 8-bit instruction codes correspond to instructions as shown in FIG. 17 in the unencrypted state. The encryption method adapted adds 1-bit key bit to the highest-order position, which is xored with 0x55 (i.e., 0x55=5x16+5) when the key bit is '0' and xored with 0xAA (i.e., 0xAA=10x16+10) when the key bit is '1'. The unencrypted instruction code of BSR is 0x5C. If the instruction code is encrypted, the instruction code for BSR can take two values as follows depending on the value of the key bit.

0x5*C* xor 0x55+0=0x009 (when key bit=0)

0x5*C* xor 0x*AA*+0x100=0x1*F*6 (when key bit=1)

Providing a many-to-one correspondence table of instruction codes and instructions by which the two values can be made to correspond to BSR can implement a decoder capable of interpreting and executing instructions without the need for decryption thereof. FIG. 18 shows a many-to-one correspondence table of instruction codes and instructions which is obtained by converting the correspondence table of instruction codes and instructions shown in FIG. 17 such that the encrypted instruction codes can be interpreted directly without decryption.

FIG. 5 shows an embodiment of an adder according to the present invention, which comprises full adders 501, 502, and 503 that are capable of operating on encrypted data directly. The encrypted full adder 501 uses one bit of first input data A0 (511), the key bit Ak (512) of the first input data, one bit of second input data B0 (513), the key bit Bk (514) of the second input data, and a third encryption bit Rk (510) which is used to encrypt the result of the add operation and the carry input, and to generate an encrypted result R0 (515) of the add operation and an encrypted carry Cout (516) to the next bit. An embodiment of the encrypted full adder 501 for encryption that inverts bits when the encryption bit is '1' is shown in FIG. 8. This type of encrypted full adder can be implemented by a logic circuit other than that shown in FIG. 8, and it can also be embodied with a circuit synthesized according to the truth table shown in FIG. 6.

An embodiment of the encrypted full adder 501 for encryption that inverts bits when the encryption bit is '0' is shown in FIG. 9. This type of encrypted full adder can be implemented by a logic circuit other than that shown in FIG. 9, and it can also be embodied with a circuit synthesized according to the truth table shown in FIG. 7.

Figure 10:
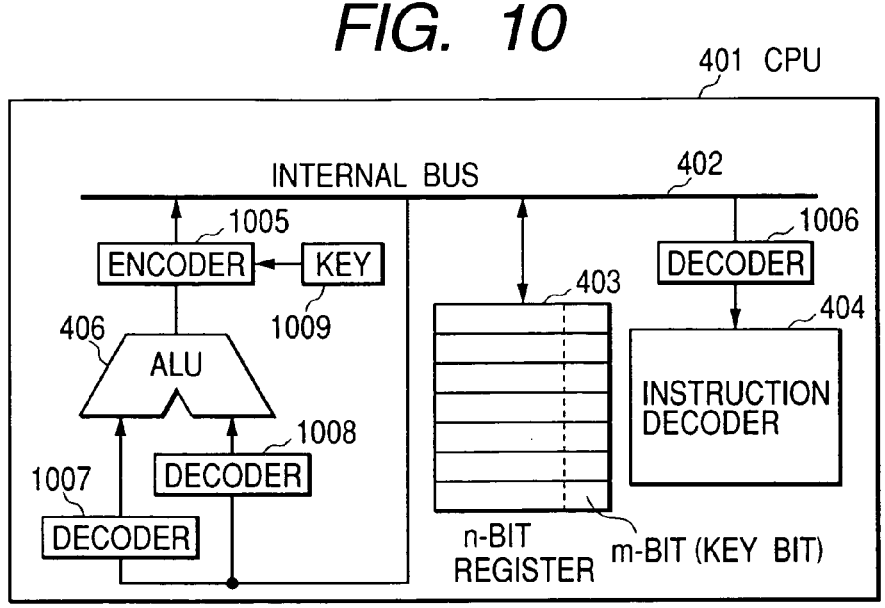
FIG. 10 is a block diagram showing an embodiment of the present invention.

FIG. 10 shows the second embodiment of the present invention. This embodiment performs arithmetic operations and instruction interpretation using an arithmetic unit 406 and an instruction decoder 404 that operate on conventional unencrypted data and instruction codes. A decoder 1006 is placed at the input point of the instruction decoder 404 such that the decrypted values are input. Similarly, this embodiment also links decoders 1007 and 1008 to each operation input point of the arithmetic unit 406, decrypts data therein, then performs operations on the decrypted data in the arithmetic unit 406, encrypts the results with encryption keys generated in the key generator 1009 in an encoder 1005, and outputs the encrypted results to the internal bus 402. The register 403 can store encrypted n-bit data and m-bit key information that was used for the encryption. FIG. 11 shows an embodiment of an encryption unit and a decryption unit for encryption algorithms used in the present invention, which uses 1-bit key bit 1101 and data bits 1104 as input to perform encryption and decryption. In this embodiment, the encryption and decryption units are implemented by the same circuit. FIG. 12 shows an embodiment in which a pair of key bits is used for encryption.

Figure 13:
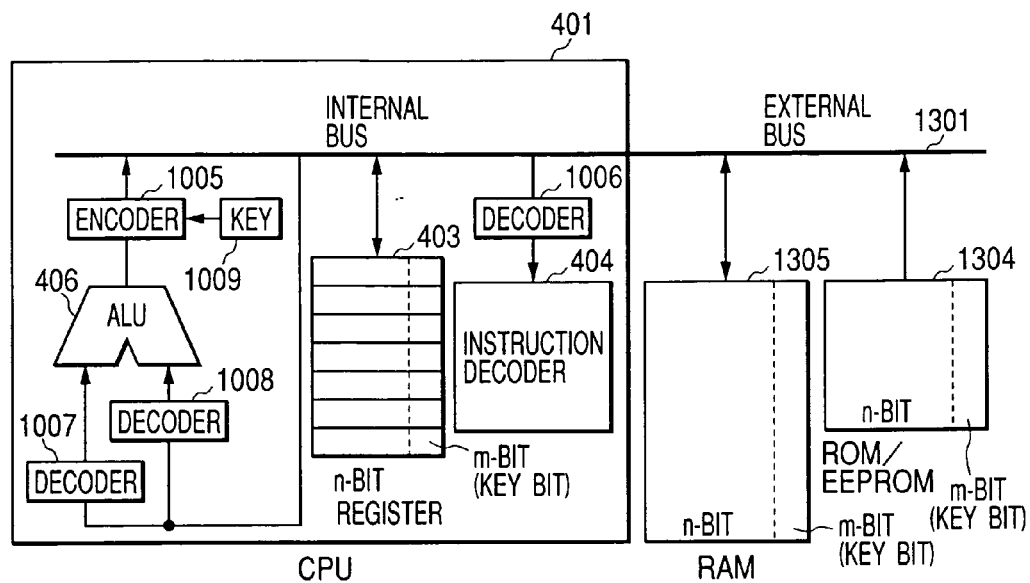
FIG. 13 shows an embodiment of the present invention.

FIG. 13 is the third embodiment of the present invention. In this embodiment, a RAM 1305 and a ROM/EEPROM 1304 are linked to the CPU 401 through an external bus 1301. The RAM 1305 can store both data encrypted in an encoder 1005 in the CPU 401 and an encryption key. The ROM/EEPROM 1304 can also store both the encryption key and data, and ROM data is encrypted in advance such that it can be decrypted by decoders 1006, 1007, and 1008 in the CPU 401. This structure has encrypted data everywhere except inside the arithmetic unit 406 and the instruction decoder 404 thereby discouraging external attacks.

Figure 14:
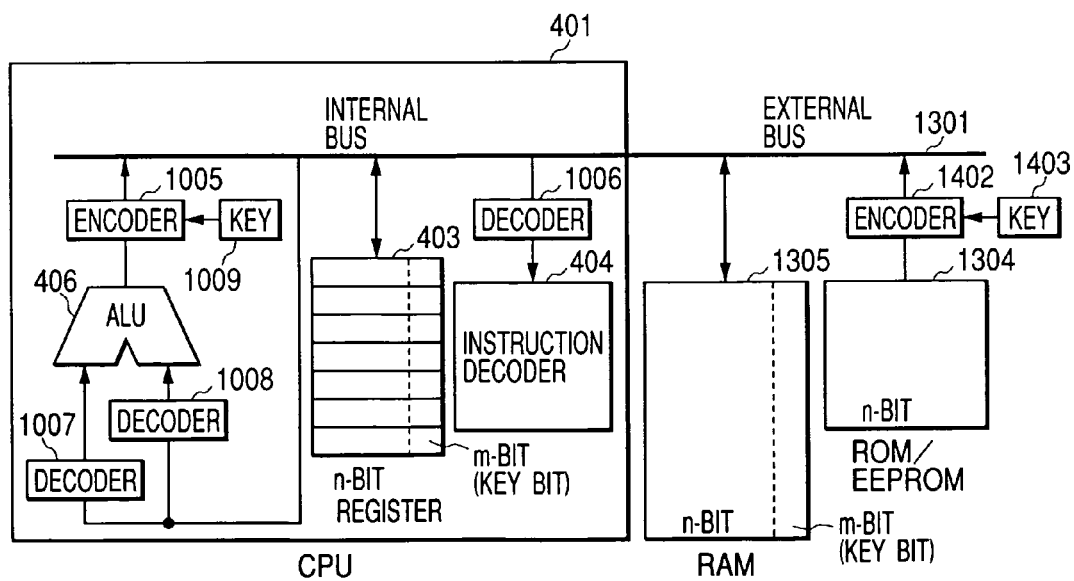
FIG. 14 shows an embodiment of the present invention.

FIG. 14 shows the fourth embodiment of the present invention. The RAM 1305 is linked to the CPU 401 through the external bus 1301. The RAM 1305 can store data that was encrypted by the encoder 1005 and encryption keys. The ROM/EEPROM 1304 is linked to the external bus 1301 through an encoder 1402 that performs encryption on the true data stored in the ROM/EEPROM 1304 according to keys generated in a key generator 1403 that generates encryption keys automatically. When the CPU 401 reads data, the data is encrypted in the encoder 1402. This embodiment provides an advantage in that ROM data sent to the external bus is encrypted. Therefore, if the same data is sent repeatedly, the data acquires different key information and its expression does not become a fixed value such that analysis by an external attacker is impeded. This embodiment can avoid placing key information in ROM data thereby resulting in reduced ROM area. Of course, it is also possible to encrypt ROM data in advance and allow the encoder 1402 to perform an operation similar to converting the key used for encryption.

Figure 15:
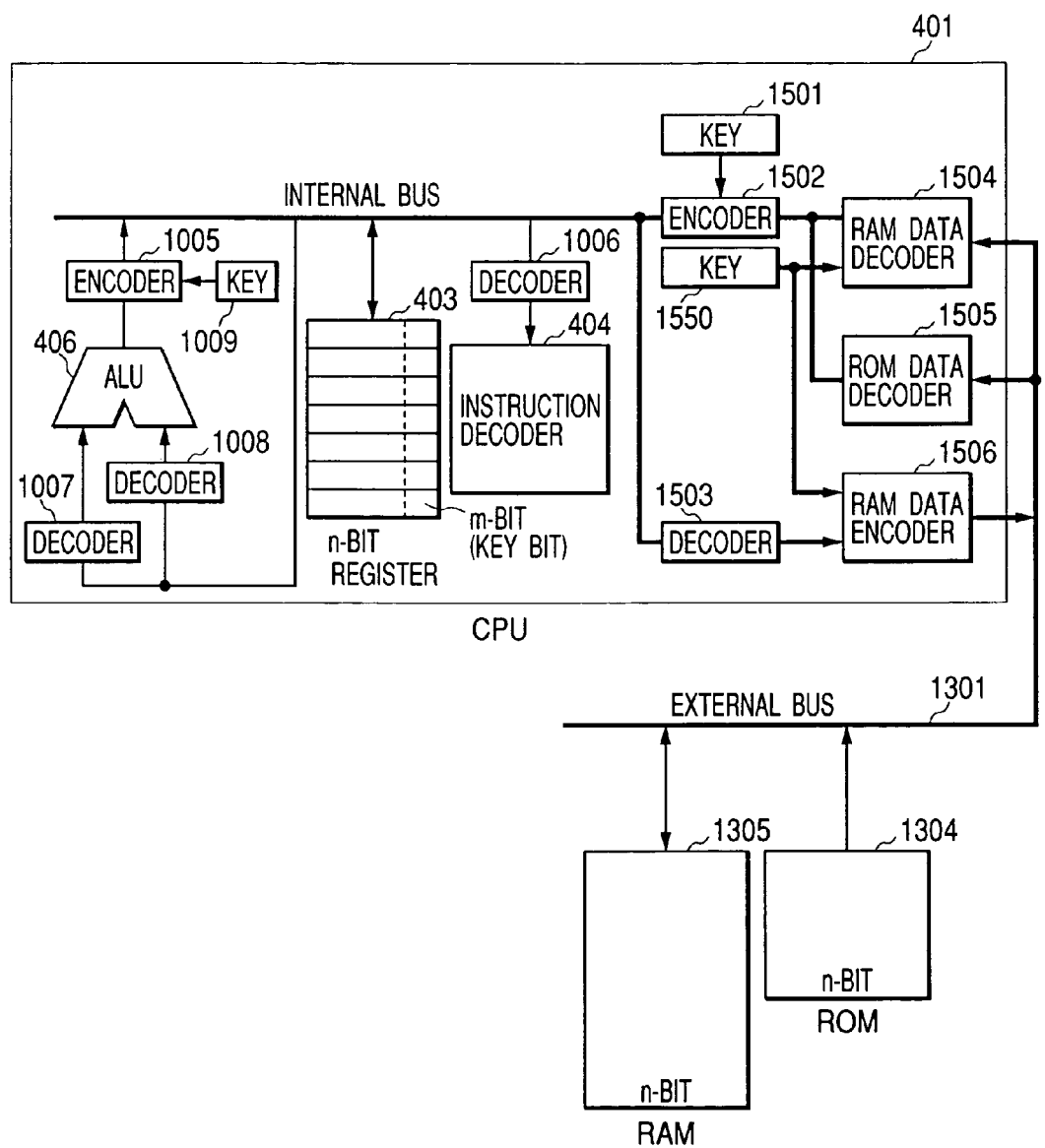
FIG. 15 shows an embodiment of the present invention.

FIG. 15 shows the fifth embodiment of the present invention. The RAM 1305 and ROM 1304 are linked to the CPU 401 through the external bus 1301. RAM data is encrypted by a predetermined method. In writing RAM data, first, data encrypted using a type I cryptographic algorithm in the CPU is decrypted in a decoder 1503, then the decrypted data is re-encrypted in a RAM data encoder 1506 into a type II encrypted data, then the type II encrypted data is output to the external bus 1301 and written into the RAM 1305. In reading RAM data, the type II encrypted data is read from the RAM 1305, then decrypted by a decoder 1504. Thereafter, the data is encrypted with the type I cryptographic algorithm in the encoder 1502, then sent to the internal data bus. ROM data is encrypted by a predetermined method, decrypted by a ROM data decoder 1505, then encrypted by an encoder 1502 with a key generated by a key generator as in the case of ROM data. This method can encrypt key information without storing the type I keys in RAM or ROM by appropriately selecting methods of encrypting and decrypting RAM and ROM data.

Figure 16:
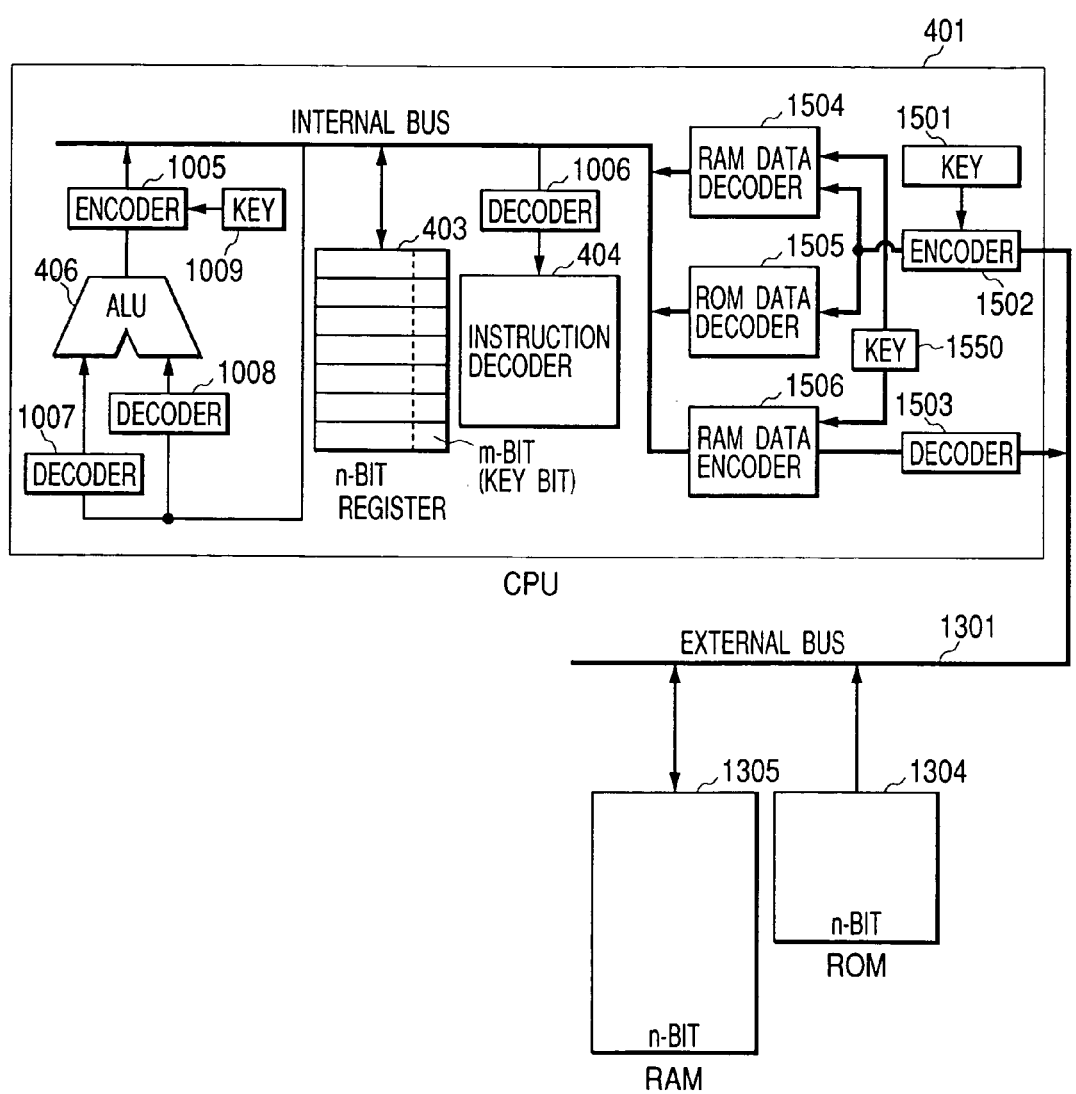
FIG. 16 shows an embodiment of the present invention.

FIG. 16 shows the sixth embodiment of the present invention, in which the disposition of the RAM decoder 1504 and the ROM data decoder 1505 and the disposition of the encoder 1502 using the cryptographic algorithm in the CPU is interchanged. The embodiment in FIG. 15 first decrypts data that was encrypted by a RAM data encryption method to restore it to plaintext data (i.e., true data), then encrypts the plaintext data according to the CPU internal encryption method (i.e., twice encryption). The embodiment in FIG. 16 appropriately selects an encryption method, further encrypts data that was encrypted by a RAM data encryption method by using the CPU's internal encryption method (i.e., double encryption), and decrypts the resultant data by a decoder adopting a decryption method corresponding to the RAM data encryption method thereby making it possible to obtain the data encrypted by the CPU's internal encryption method. One possible cryptographic method that can be applied in this cryptographic algorithm is the Vernum cipher (*A primer of cryptography* written by Eiji Okamoto, published by KYORITSU SHUPPAN). Accordingly, no plain text data is in existence during the transition between the type I encrypted data and the type II encrypted data in the six embodiment.

According to the embodiments of the present invention, it is possible to provide information processing devices with higher security. It is also possible to provide IC card components and information processing systems with higher security.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A semiconductor chip comprising:
   an internal bus;
   an arithmetic unit which is input from the internal bus and outputs into the internal bus; and
   a key generator which generates a key data and changes the key data as time goes by;
   wherein the internal bus transfers an encrypted data and the key data which accompanies the encrypted data in parallel; and
   the encrypted data is encrypted by the key data accompanying the encrypted data;

the input data of the arithmetic unit is the encrypted data and the key data accompanying the encrypted data;

the output data of the arithmetic unit is the encrypted data and the key data generated by the key generator.

2. The semiconductor chip according to claim 1:
wherein the size of the key data is 1 bit.

3. The semiconductor chip according to claim 1:
wherein the encrypted data is encrypted by a Vernum cipher.

4. The semiconductor chip according to claim 1 further comprising:
an instruction decoder;
wherein the instruction decoder decodes an encrypted instruction code according to many-to-one correspondence between the encrypted instruction codes and instructions.

5. The semiconductor chip according to claim 4:
wherein a number of encrypted instruction codes corresponding to one of the instructions is equal to a number of the different values of the key data.

6. The semiconductor chip according to claim 1 further comprising:
an external bus;
wherein internal bus, the arithmetic unit and a key generator make up a central processing unit; and
the internal bus is coupled to the external bus.

7. The semiconductor chip according to claim 6 further comprising:
a memory;
wherein the external bus is coupled to a memory.

8. The semiconductor chip according to claim 1 further comprising:
an external bus;
a second decoder;
a second encoder; and
a second key generator;
wherein internal bus, the arithmetic unit, a key generator, second decoder and second encoder make up a central processing unit;
the internal bus is coupled to the external bus via the second decoder and the second encoder;
the second decoder decodes decrypts the encrypted data from the internal bus and outputs the decrypted data into the external bus; and
the second encoder encrypts a data transferred through the external bus and outputs the encrypted data into the internal bus.

9. An information processing device which comprises a semiconductor chip having an internal bus; an arithmetic unit which is input from the internal bus and outputs into the internal bus; and a key generator which generates a key data and changes the key data as time goes by; wherein the internal bus transfers an encrypted data and the key data which accompanies the encrypted data in parallel; the encrypted data is encrypted by the key data accompanying the encrypted data; and the input data of the arithmetic unit is the encrypted data and the key data accompanying the encrypted data; the output data of the arithmetic unit is the encrypted data and the key data generated by the key generator.

10. A semiconductor chip comprising:
an internal bus;
an arithmetic unit;
a key generator which generates a key data and changes as time goes by;
a decoder; and
an encoder;

wherein the internal bus transfers an encrypted data and the key data accompanying the encrypted data in parallel; and the decoder decrypts the encrypted data by the key data accompanying the encrypted data, and inputs the decrypted data into the arithmetic unit;

the encoder encrypts an output data from the arithmetic unit by the key data generated by the key generator and outputs the encrypted data and the key data generated by the key generator into the internal bus.

11. The semiconductor chip according to claim 10 further comprising:
wherein the size of the key data is 1 bit.

12. The semiconductor chip according to claim 10:
wherein the encrypted data is encrypted by a Vernum cipher.

13. The semiconductor chip according to claim 10 further comprising:
an instruction decoder; and
a second decoder;
wherein the second decoder decrypts an encrypted instruction code by the key data accompanying the encrypted instruction code, and inputs the decrypted instruction code into the instruction decoder.

14. The semiconductor chip according to claim 10 further comprising:
an external bus;
wherein internal bus, the arithmetic unit, the key generator, the decoder and the encoder make up a central processing unit; and
the internal bus is coupled to the external bus.

15. The semiconductor chip according to claim 14 further comprising:
a memory;
wherein the external bus is coupled to a memory.

16. The semiconductor chip according to claim 10 further comprising:
an external bus;
a second decoder; and
a second encoder;
wherein internal bus, the arithmetic unit, the key generator, second decoder and second encoder make up a central processing unit;
the internal bus is coupled to the external bus via the second decoder and the second encoder;
the second decoder decrypts the encrypted data from the internal bus and outputs the decrypted data into the external bus; and
the second encoder encrypts a data transferred through the external bus by the key data generated by the key generator and outputs the encrypted data and the key data generated by the key generator into the internal bus.

17. The semiconductor chip according to claim 16 further comprising:
a RAM connected to the external bus;
a RAM data encoder connected to the external bus and the second decoder; and
a RAM data decoder connected to the external bus and the second encoder;
wherein the RAM data encoder encrypts a data from the second decoder and transfers the encrypted data to the RAM through the external bus ; and
the RAM data decoder decrypts a data of RAM transferred through the external bus and inputs the second encoder.

18. The semiconductor chip according to claim 17 further comprising:
  a ROM connected to the external bus; and
  a ROM data decoder connected to the external bus and the second encoder;
  wherein a data of the ROM is encrypted by a predetermined cipher;
  the ROM data decoder decrypts the data of ROM transferred through the external bus and inputs the decrypted data into the second encoder.

19. An IC card which comprises a semiconductor chip comprising: an internal bus; an arithmetic unit; a key generator which generates a key data and changes as time goes by; a decoder; and an encoder, wherein the internal bus transfers an encrypted data and the key data accompanying the encrypted data in parallel; the decoder decrypts the encrypted data by the key data accompanying the encrypted data, and inputs the decrypted data into the arithmetic unit; and the encoder encrypts a output data from the arithmetic unit by the key data generated by the key generator and outputs the encrypted data and the key data generated by the key generator into the internal bus.

20. An information processing device which comprises a semiconductor chip which comprises an internal bus; an arithmetic unit; a key generator which generates a key data and changes as time goes by; a decoder; and an encoder; wherein the internal bus transfers an encrypted data and the key data accompanying the encrypted data in parallel; the decoder decrypts the encrypted data by the key data accompanying the encrypted data, and inputs the decrypted data into the arithmetic unit and the encoder encrypts a output data from the arithmetic unit by the key data generated by the key generator and outputs the encrypted data and the key data generated by the key generator into the internal bus.

* * * * *